United States Patent
Hühn et al.

(10) Patent No.: US 8,734,888 B2
(45) Date of Patent: May 27, 2014

(54) COCOA BEAN PROCESSING METHODS AND TECHNIQUES

(75) Inventors: Tilo Hühn, Schönenberg (CH); Roland Laux, Roggwil (CH)

(73) Assignees: Unico-First AG, St. Gallen (CH); Zuercher Hochschule fuer Angewandte Wissenschaften Grueental, Waedenswil (CH)

( * ) Notice: Subject to any disclaimer, the term of this patent is extended or adjusted under 35 U.S.C. 154(b) by 372 days.

(21) Appl. No.: 13/141,829

(22) PCT Filed: Dec. 24, 2009

(86) PCT No.: PCT/IB2009/007893
§ 371 (c)(1),
(2), (4) Date: Sep. 11, 2011

(87) PCT Pub. No.: WO2010/073117
PCT Pub. Date: Jul. 1, 2010

(65) Prior Publication Data
US 2011/0311709 A1    Dec. 22, 2011

Related U.S. Application Data

(60) Provisional application No. 61/140,844, filed on Dec. 24, 2008.

(51) Int. Cl.
*A23G 1/48* (2006.01)
(52) U.S. Cl.
USPC .......................................... 426/655; 426/431
(58) Field of Classification Search
USPC ................................ 426/655, 431
See application file for complete search history.

(56) References Cited

U.S. PATENT DOCUMENTS

| | | | | | |
|---|---|---|---|---|---|
| 1,650,356 | A | * | 11/1927 | Hocker | 426/45 |
| 1,751,331 | A | * | 3/1930 | Hocker | 435/271 |
| 1,803,615 | A | * | 5/1931 | Hocker | 435/271 |
| 1,808,831 | A | * | 6/1931 | Borg | 554/17 |
| 4,758,444 | A | | 7/1988 | Terauchi et al. | |
| 6,610,343 | B2 | * | 8/2003 | Purtle et al. | 426/430 |
| 2007/0082110 | A1 | * | 4/2007 | Morley et al. | 426/601 |
| 2007/0196556 | A1 | * | 8/2007 | Van Der Meer | 426/593 |
| 2009/0269439 | A1 | | 10/2009 | Moulay et al. | |

FOREIGN PATENT DOCUMENTS

| | | |
|---|---|---|
| EP | 0819383 A2 | 1/1998 |
| EP | 1452095 A1 | 9/2004 |
| EP | 1595458 A1 | 11/2005 |
| EP | 1680963 A1 | 7/2006 |
| GB | 438280 A | 11/1935 |
| GB | 6222628 A | 5/1949 |
| GB | 2416107 A | 1/2006 |
| WO | 2010073114 A1 | 7/2010 |

OTHER PUBLICATIONS

Asep et al., "The effects of particle size, fermentation and roasting of cocoa nibs on supercritical fluid extraction of cocoa butter," in Journal of Food Engineering, vol. 85, Aug. 17, 2007, pp. 450-458.

* cited by examiner

*Primary Examiner* — Anthony Weier
(74) *Attorney, Agent, or Firm* — Joyce von Natzmer; Agris & von Natzmer LLP

(57) ABSTRACT

Improved methods and/or techniques for processing and/or extracting materials from cocoa beans. In certain embodiments, cocoa bean processing methods (e.g., using unfermented or fermented or roasted or non-roasted beans) which result in cocoa products with improved taste characteristics and/or increased levels of anti-oxidants and/or vitamins.

27 Claims, 15 Drawing Sheets

Mass Balance Cocoa Extraction Process

| Product | Share within Suspension [%] |
|---|---|
| Net weight cocoa/water suspension | 100 |
| Net weight cocoa nibs | 16-43 |
| Addition of water | 57-84 |
| Net weight cocoa solids after decanter | 11-23 |
| Net weight cocoa solids after screen | 0.1-5 |
| Net weight water phase after decanter | 50-80 |
| Net weight oil phase after decanter | 4-25 |
| Net weight polyphenol concentrate | 4-7 |
| Net weight aroma after dryer (solid phase) | 4-7 |
| Net weight aromaconcentrate (liquid phase) | 0.1-5 |
| Net weight cocoa butter | 2-20 |

COCOA BEAN PROCESSING METHODS AND TECHNIQUES

RELATED APPLICATION DATA

This application is the U.S. national stage of International application PCT/IB2009/007893, filed Dec. 24, 2009 designating the United States and claims the benefit of U.S. Provisional Patent Application No. 61/140,844, filed on Dec. 24, 2008 and similarly titled. The entirety of such application is hereby incorporated be reference.

FIELD OF INVENTION

This invention relates to improved methods and/or techniques for processing and/or extracting materials from cocoa beans. In certain embodiments, this invention relates to cocoa bean processing methods (e.g., using unfermented or fermented or roasted or non-roasted beans) which result in cocoa products with improved taste characteristics and/or increased levels of anti-oxidants and/or vitamins.

BACKGROUND OF THE INVENTION

The types of methods and the steps employed for processing cocoa beans into their respective food products have a significant influence on the various qualities of the resulting cocoa product(s) such as with respect to flavor, intensity, or anti-oxidant or vitamin content and even yield. For this reason, the method employed for processing cocoa beans into cocoa products (such as food stuffs) can be critically important to the commercial viability or success or acceptance of such products (in the marketplace, or in use for enhancement of other products).

A typical cocoa bean processing procedure begins with the harvest of the beans followed by the fermenting and drying of the cocoa beans. Afterwards, the beans are typically cleaned and roasted. Once prepared for further processing, the cocoa beans, in conventional or prior art methods, are subjected to processing techniques such as those described in Patent Publication No. PCT/JP2002/012064 (hereinafter "the '064 method" or "the '064 publication").

Although believed to reflect at least one convention in cocoa bean processing techniques, the processing methods employed in the '064 publication have one or more drawbacks or deficiencies and/or otherwise do not fulfill all of the desirable needs in the subject art. For example, the '064 method results in a destruction of cellular compartments of the raw cocoa materials due to high mechanical loads or shear stresses and/or high heat employed which aids in the extraction of cocoa fats. Specifically, using the '064 method, frictional heat generated by the mechanical extraction techniques liquefies the cocoa fat and forms a chocolate liqueur. Using this technique, however, results in emulsification of oil-fat fractions which, in turn, complicates later desirable phase separation processes and/or steps by which important or desirable cocoa products can otherwise be obtained. In particular, separation of the oil-fat phase becomes difficult or even impossible after emulsification without the use of undesirable solvents such as hexanol (i.e., water is generally useless as a solvent after emulsification). Furthermore, obtaining or retaining desirable flavors and/or cocoa products such as aromatics, anti-oxidants, and/or vitamins becomes difficult or is otherwise inefficient using the '064 method.

In view of the above enumerated drawbacks and/or desires for improvements in the art, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, the present invention is directed to techniques for processing and/or extracting material from cocoa beans. In certain embodiments, the invention relates to methods for processing cocoa beans which utilize water which is otherwise considered undesirable in cocoa bean processing techniques. In still other embodiments, the invention relates to methods for processing cocoa beans which utilize lower processing temperatures either with or without water addition steps. In some embodiments of the invention, methods for producing virgin or extra virgin cocoa products are provided in which loss or damage or deterioration of cocoa bean products or materials (e.g., aromatics, polyphenols, vitamins etc.) during processing is reduced. In at least one embodiment, a method for producing cocoa intermediate products such as cocoa butter is provided. In other embodiments, chocolate product "construction kits" are provided which, for example, can include different elements for making chocolate. In certain example kits, aromatics, cocoa butter, cocoa powder, and/or polyphenols are included. Using such kits, different elements in different mixtures or quantities can be combined, as desired, in order to determine aroma qualities, content of fat, health effects, and/or other characteristics of the chocolate or other cocoa products produced.

In one non-limiting embodiment of the invention, a method for processing cocoa beans which employs relative low heat, low shear forces, and/or permits use of water as an extraction solvent is provided. In these or alternative embodiments, improvement(s) in taste of cocoa products are achieved (e.g., they are less bitter which results in reduced need for sugar) and/or improved retention of anti-oxidants and/or fat soluble vitamins (for health benefits) is obtained. In certain embodiments, using lower processing temperatures, for example, preservation of higher quantities of the original or primary components of the cocoa bean, including preservation of roasting or aroma components is achieved. In further embodiments, extraction of aromatics and/or polyphenols (for use in creation and/or refinement of food and non-food products) is obtained.

In one exemplar, non-limiting embodiment of the subject invention, therein is provided a method for processing cocoa beans comprising:
  breaking a plurality of cocoa beans;
  adding water to the broken cocoa beans to form a suspension;
  coarse grinding the cocoa bean mixture/suspension;
  fine grinding the cocoa bean mixture/suspension;
  heating the finely ground cocoa bean mixture/suspension;
  decanting the cocoa bean mixture/suspension to separate larger solids from liquid;
  separating smaller and/or fine solid particles from liquids and/or separating oil products from non-oil products.

In another exemplar, non-limiting embodiment of the subject invention, therein is provided a method for processing cocoa beans comprising:
  adding water to a plurality of cocoa beans to form a mixture;
  fine grinding the cocoa bean/water mixture;
  heating the finely ground cocoa bean/water mixture to a temperature of approximately 70 degrees Celsius or less;

decanting the cocoa bean mixture/suspension to separate larger solids from liquid;

separating smaller and/or fine solid particles from liquids and/or separating oil products from non-oil products.

In at least one embodiment, the initial breaking of whole cocoa beans is accomplished using a hammer mill. In the same or a different embodiment, a colloid mill is used in an initial (e.g., course) grinding step and/or a corundum stone mill is employed in a later (e.g, fine) grinding step. Notably, however, any mill can be used that results in a particle size generally equal to or under approximately 40 micrometers, more preferably equal to or less than 30 micrometers, and most preferably equal to or less than 10 micrometers. In either or both of these steps, undesirably high pressures and/or mechanical forces are not required or employed and therefore undesired levels of emulsification of cocoa bean material does not occur. In certain particularly preferred but non-limiting embodiments, cocoa beans are ground to particle sizes of approximately 10 μm or smaller. Employing such particle sizes in such embodiments enables a water solvent to properly wet the material (because of increased surface area) which, in turn, results in better extraction results (e.g., better yields of desirable cocoa bean materials such as fats or lipids, aromatic substances, and/or polyphenols).

In certain non-limiting embodiments, in a heating step, liquefaction of cocoa butter is obtained and/or improved mechanical phase separation is achieved. In different or related embodiments, a decanting step employing centrifugal forces is employed. In such a step, larger particles are generally separated from liquid. Moreover, solids separated in this step may be dried (e.g., for use in chocolate production or processing). In certain embodiments, in a second separation step, removal of smaller or fine particles from liquid is achieved. In such a step, oil based products such as cocoa butter and/or hydrophobic aromatic components can be or are separated from liquid phase components such as cocoa extract and/or hydrophilic aromatic products and/or polyphenol components.

In certain preferred but non-limiting embodiments, if there is microorganism spoilage of cocoa extracted materials (e.g., cocoa butter), such material can be deodorized employing a vacuum de-aerator. In other preferred example embodiments, if microorganism decontamination occurs, a high pressure treatment such as pascalisation is possible (e.g., which can preserve aromatic compounds). In embodiments in which microorganism spoilage and contamination occurs, heat treatment and deodorization may be employed.

In still further embodiments, a separated liquid phase (e.g., degreased cocoa extract) can be further treated to remove undesired water. This may be achieved using evaporation techniques which, when employed, can desirably, result in water suspended flavor compounds. Moreover, concentrated polyphenols may result. In yet still further embodiments, recovered cocoa flavors may be enhanced by reverse flow distillation (e.g., to separate flavor components from water).

In certain embodiments, water which results from the above or related non-limiting embodiments (gained by decantation, separation, and/or evaporation) may be sterilized and/or tyndallized (to kill spores) such as by heat to prevent microorganism spoilage and/or propagation and/or may be deodorized by vacuum de-aerator.

In one embodiment of a method or technique according to the herein described invention, "fixed phase" (e.g., using an absorber), "water phase", and "oil phase" fractions are each extracted and separated after fine grinding of the cocoa beans in a single process step. In further process steps in such embodiment, the fractions are purified and separated into products such as dried and extracted cocoa powder, cocoa butter with hydrophobic cocoa flavor, hydrophilic cocoa flavor, and polyphenol concentrate.

In yet another exemplar, non-limiting embodiment of the subject invention, therein is provided a method for processing cocoa beans comprising:

adding water to a plurality of unfermented, fermented and/or pre-dried and/or roasted cocoa beans to form a suspension;

wet grinding said cocoa bean water suspension in a first grinding step in a first mill;

wet grinding said cocoa bean water suspension in a second grinding step in a second mill;

heating said cocoa bean water suspension to a temperature of approximately 70 degrees Celsius or less;

decanting said cocoa bean water suspension such that said suspension is separated into three phases, a water phase, a fat phase, and solids.

In a further embodiment according to or in combination with any one of the preceding or following embodiments, a method is provided further including a step wherein said solids are dried in a dryer after separation in said decanting step to obtain aromatics and cocoa solids.

In a further embodiment according to or in combination with any one of the preceding or following embodiments, a method is provided further including a step wherein material obtained as said water phase is processed in a two phase separator to remove fine particles from said water phase.

In a further embodiment according to or in combination with any one of the preceding or following embodiments, a method is provided further including a step wherein said water phase is subjected to a first concentration step to obtain aromatics.

In a further embodiment according to or in combination with any one of the preceding or following embodiments, a method is provided further including a step wherein said water phase is subjected to a second concentration step to obtain polyphenols.

In a further embodiment according to or in combination with any one of the preceding or following embodiments, a method is provided further including a step wherein said fat phase is filtered on a vibrating screen to remove substantial solids.

In a further embodiment according to or in combination with any one of the preceding or following embodiments, a method is provided further including a step wherein said fat phase is further processed in a three phase separator to remove excess water and remaining solids.

In a further embodiment according to or in combination with any one of the preceding or following embodiments, a method is provided further including a step wherein said fat phase is filtrated and cocoa butter is obtained.

In a further embodiment according to or in combination with any one of the preceding or following embodiments, a method is provided wherein cocoa butter is produced and when said cocoa butter exits said decanting step, said cocoa butter is caused to exit at a temperature selected from between approximately 45 and 50 degrees Celsius.

In a further embodiment according to or in combination with any one of the preceding or following embodiments, a method is provided wherein cocoa powder is produced which said cocoa powder is dried at a temperature selected from between approximately 50 and 70 degrees Celsius.

In a further embodiment according to or in combination with any one of the preceding or following embodiments, a method is provided wherein said first grinding step is performed with a perforated disc mill.

In a further embodiment according to or in combination with any one of the preceding or following embodiments, a method is provided wherein said second grinding step is performed with a toothed colloid mill.

In a further embodiment according to or in combination with any one of the preceding or following embodiments, a method is provided wherein said second grinding step is performed with a corundum stone mill.

In a further embodiment according to or in combination with any one of the preceding or following embodiments, a method is provided wherein after said first grinding step, a pump pumps said cocoa bean water suspension to a location wherein said second grinding step is performed.

In a further embodiment according to or in combination with any one of the preceding or following embodiments, a method is provided wherein during said heating step, said cocoa bean water suspension is heated utilizing a tube heat exchanger.

In a further embodiment according to or in combination with any one of the preceding or following embodiments, a method is provided wherein prior to one or more wet grinding steps, sugar and/or fruit juices and/or cocoa pulp are added to the cocoa bean water suspension or mixture.

In a further embodiment according to or in combination with any one of the preceding or following embodiments, a method is provided further including an additional step where wet solids are treated with a heatable roll grinder to reduce particle size and begin pre-drying.

In a further embodiment according to or in combination with any one of the preceding or following embodiments, a method is provided further including a step in which sugar, sugar solution, and/or fruit juices and/or cocoa pulp are added to extracted cocoa solids before drying.

In a further embodiment according to or in combination with any one of the preceding or following embodiments, a method is provided wherein extracted cocoa solids are dried on a vacuum belt dryer following separation in said decanting step.

In a further embodiment according to or in combination with any one of the preceding or following embodiments, a method is provided wherein a drying step produces aromatics and/or cocoa solids.

In a further embodiment according to or in combination with any one of the preceding or following embodiments, a method is provided wherein said heavy phase is treated by a two phase separator and a vacuum rotation filter to remove fine particles.

In a further embodiment according to or in combination with any one of the preceding or following embodiments, a method is provided wherein prior to one or more grinding steps, said cocoa beans are broken to form cocoa nibs.

In a further embodiment according to or in combination with any one of the preceding or following embodiments, a method is provided wherein in one or more grinding steps, said cocoa bean water suspension or mixture is ground to include cocoa bean particle sizes of substantially no more than approximately 10 micrometers or less.

In a further embodiment according to or in combination with any one of the preceding or following embodiments, a method is provided wherein when at least two grinding steps are performed, a coarse grinding of said cocoa bean water suspension or mixture is performed prior to a fine grinding step.

In a further embodiment according to or in combination with any one of the preceding or following embodiments, a method is provided wherein said cocoa processing steps are performed without use of non-water solvents.

In a further embodiment according to or in combination with any one of the preceding or following embodiments, a method is provided wherein each of said cocoa processing steps are performed at temperatures of no more than approximately 70 degrees Celsius (e.g., possibly except for optional pasteurization or conventional drying steps to treat extracts if needed).

In at least one embodiment, a chocolate construction kit including a plurality of cocoa bean extraction products produced in accordance with method steps set forth in any one of the preceding embodiments is provided. In at least one of such example embodiments, such a chocolate construction kit includes, as part of the kit, aromatics, cocoa butter, cocoa powder, and/or polyphenols and/or vitamins.

Certain examples of the invention are now below described with respect to certain non-limiting embodiments thereof as illustrated in the following drawings wherein:

BRIEF DESCRIPTION OF THE DRAWINGS

FIG. 15 illustrates example mass percentages of cocoa products which may be obtained when performing one or more of the herein described cocoa bean processing techniques.

DETAILED DESCRIPTION OF CERTAIN EMBODIMENTS

Figure 1:
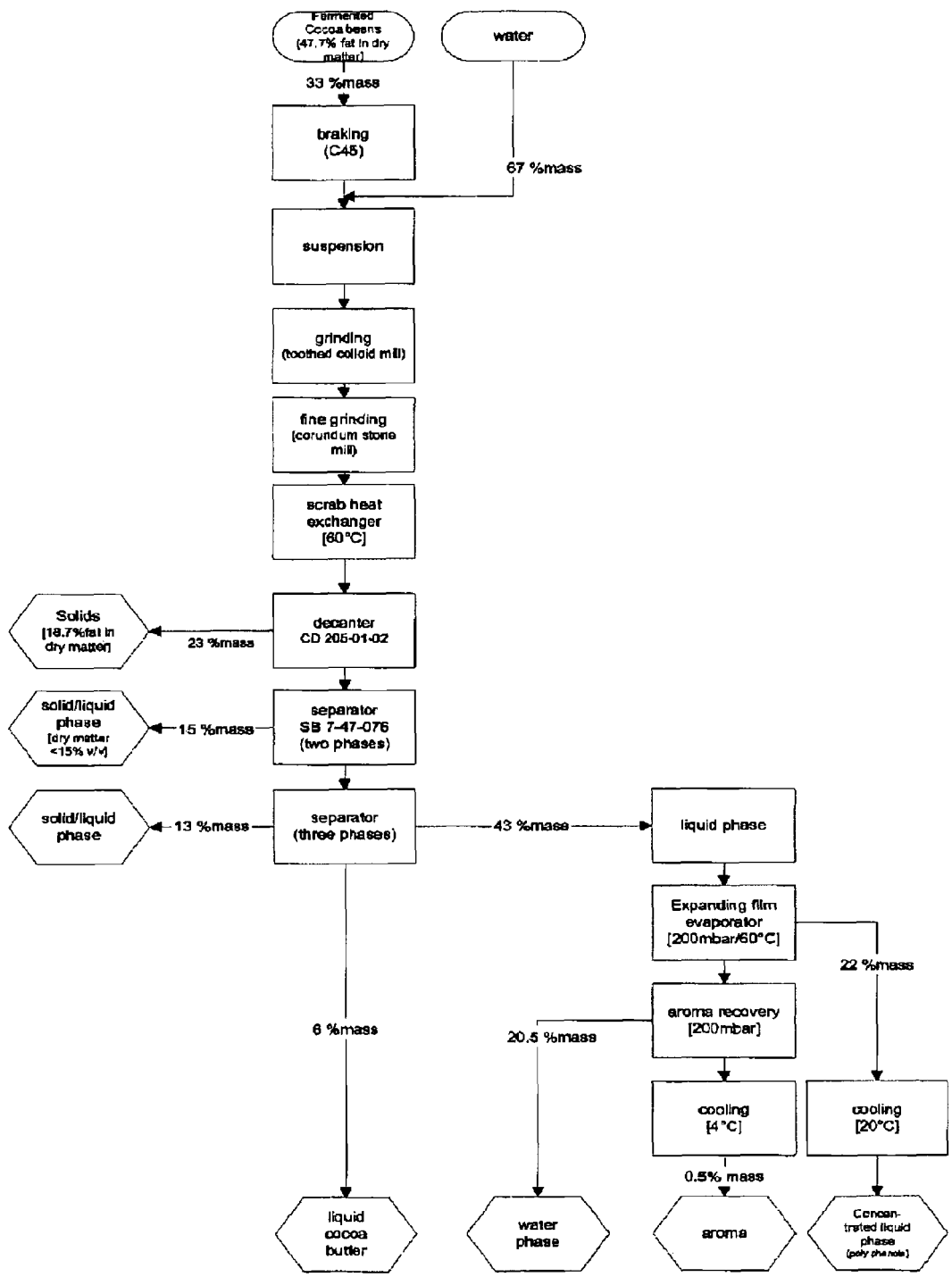
FIG. 1 schematically illustrates an embodiment of one exemplar cocoa processing technique according to the subject invention.
Figure 2:
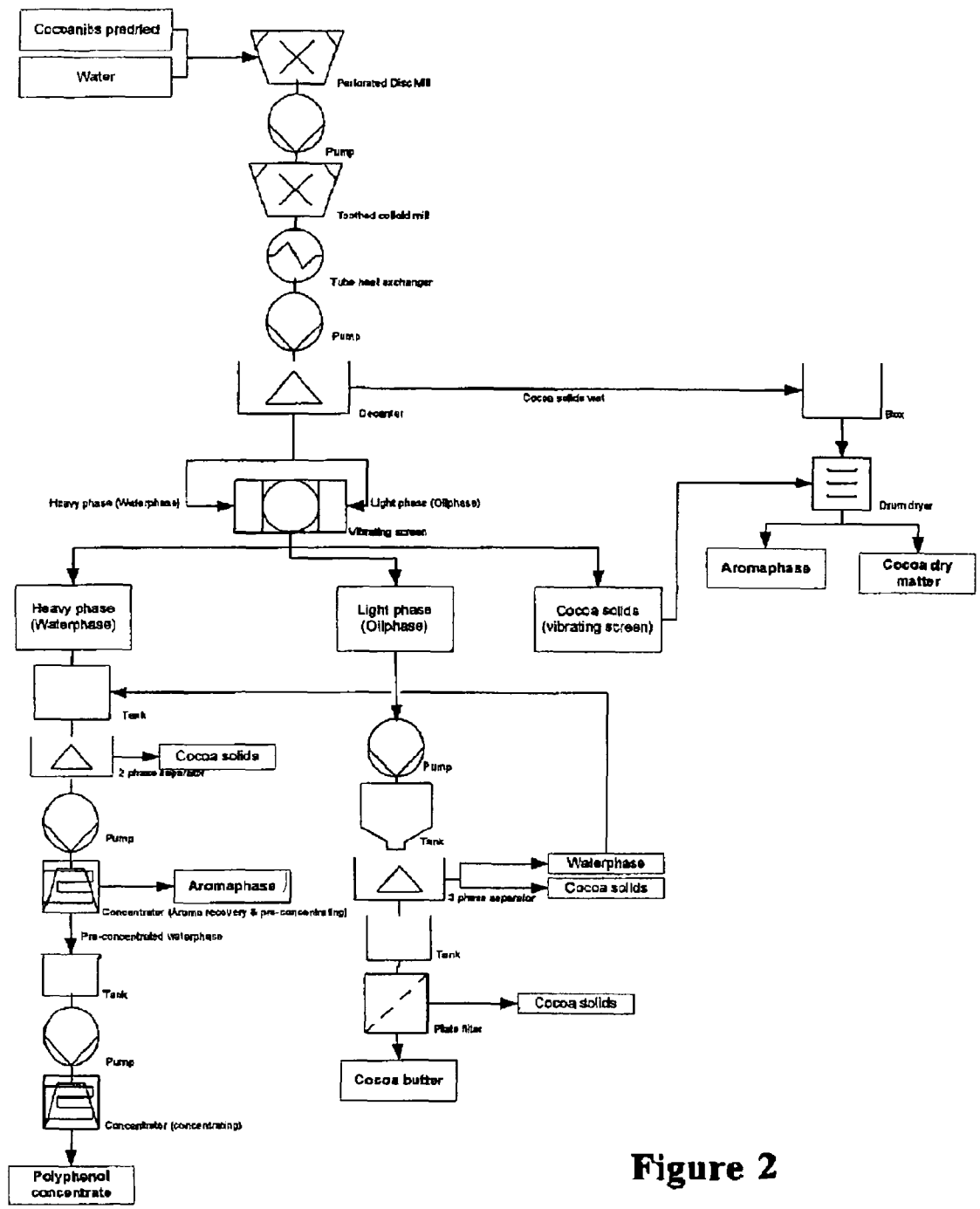
FIG. 2 schematically illustrates an embodiment of an alternative cocoa processing technique according to the subject invention.
Figure 3:
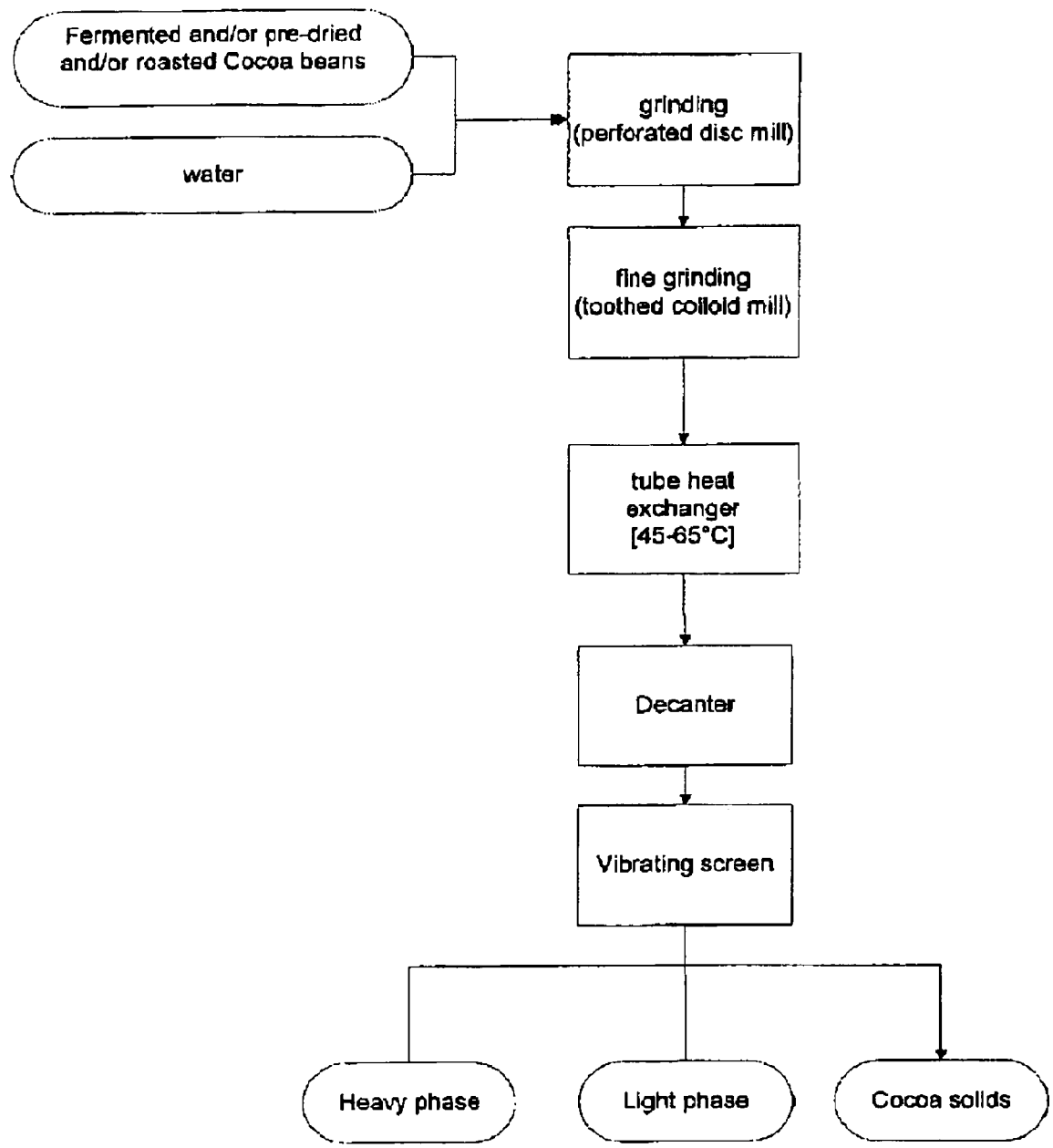
FIG. 3 schematically illustrates certain steps in the embodiment of the cocoa processing technique illustrated in FIG. 2.
Figure 4:
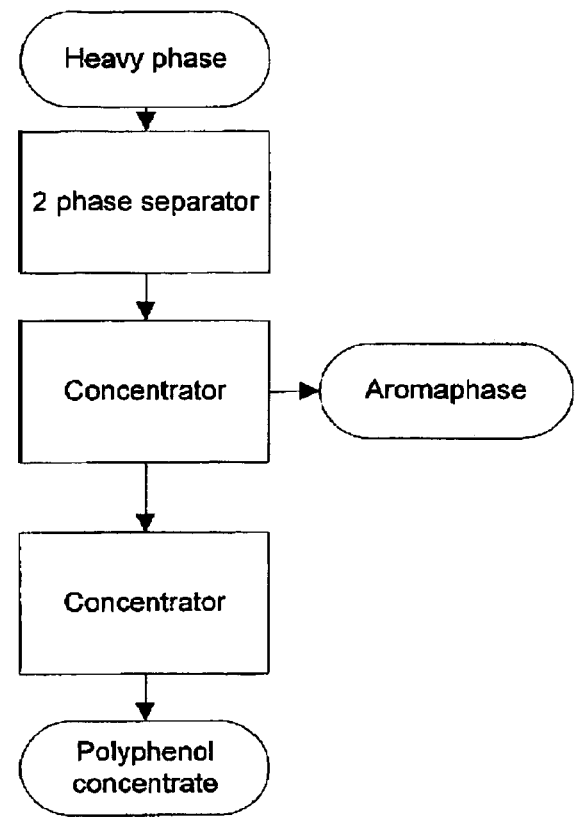
FIG. 4 schematically illustrates certain additional steps in the embodiment of the cocoa processing technique illustrated in FIG. 2.
Figure 5:
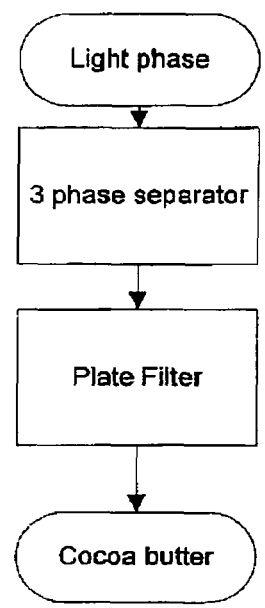
FIG. 5 schematically illustrates yet additional steps in the embodiment of the cocoa processing technique illustrated in FIG. 2.
Figure 6:
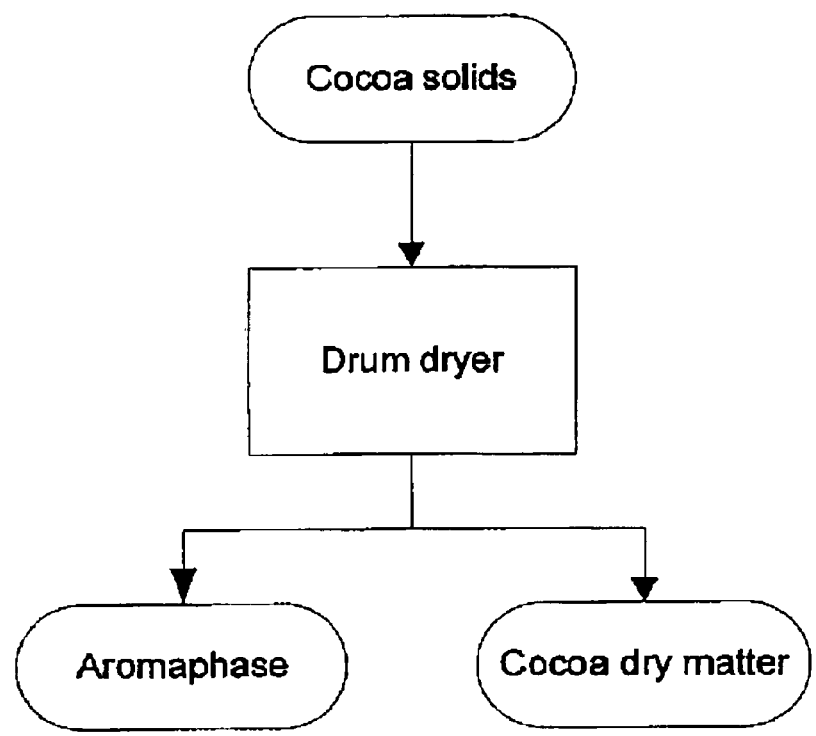
FIG. 6 schematically illustrates still further steps in the embodiment of the cocoa processing technique illustrated in FIG. 2.

For a more complete understanding of the present invention, reference is now made to the following description of various illustrative and non-limiting embodiments thereof, taken in conjunction with the accompanying drawings in which like reference numbers indicate like features.

Generally speaking, this invention relates, in certain non-limiting embodiments, to methods for processing cocoa beans in which less destruction or loss or damage to naturally occurring cocoa bean materials or compounds or elements (e.g., aromatics, polyphenols, etc.) occurs. Employing such methods, virgin or extra-virgin type cocoa products (e.g., final products such as chocolate or intermediate products such as cocoa butter) may be obtained or produced. In one or more of such cocoa bean processing methods, water is utilized which, prior to Applicants' discovery of the inventive techniques discussed herein, has otherwise been considered undesirable in conventional cocoa bean processing techniques. In still other embodiments, such methods for processing cocoa beans utilize lower processing temperatures either with or without water addition steps.

For example, in certain embodiments of the subject invention, after adding water to a plurality of cocoa beans to form a mixture or suspension and then fine grinding the cocoa bean/water suspension or mixture, the suspension (or mixture) is heated, in further processing steps, to a temperature of preferably no more than approximately 70 degrees Celsius. Afterwards, the mixture or suspension is decanted to separate larger solids from liquid(s) and then smaller and/or fine solid particles are further separated from liquids and/or oil products are separated from non-oil products.

In certain more specific example embodiments, fermented and/or non-fermented and/or pre-dried and/or roasted cocoa beans (or nibs) are put into suspension and then wet grinded (e.g., optionally with further water) in a perforated disc mill. Subsequently, a pump conveys the milled suspension to a toothed colloid mill for a second or fine grinding step. Afterwards, the suspension is heated by passing it through a tube heat exchanger so that it reaches a temperature of approximately 70° C. and then it is delivered to a decanter. In the decanter, the suspension is separated into three phases, the heavy phase (water phase), the light phase (fat phase), and the solid phase. The solid phase or solids are dried in a drum dryer preferably, but not necessarily, immediately after the separation which occurs in the decanter. In particular, aromatics and cocoa solids may be gained through such drying process. The heavy phase is further processed in a two phase separator to remove the finest particles out from the suspension. Aroma recovery takes place in a subsequent concentrator at the same time the water (or heavy) phase is pre-concentrated. In another processing step, the pre-concentrated suspension is further concentrated to obtain polyphenols or polyphenol concentrate. The light phase is filtered employing a vibrating screen to remove the rough solids and then is processed in a three phase separator where the removal of excessive water and solids takes place. The resulting light phase is then filtered once again and cocoa butter is obtained.

Optionally, in certain embodiments, prior to one or more wet grinding steps, sugar and/or fruit juices are added to the cocoa bean water suspension or mixture. Further optionally, a corundum mill or other mill type may be used for the second or fine grinding step (i.e., of course, any mill or mills may be employed in any number of steps so long as desirably small particle sizes are obtained). In other optional embodiments, wet solids are treated with a heatable roll grinder to reduce particle size and begin pre-drying. Moreover, sugar, sugar solution, and/or fruit juices may optionally be added to extracted cocoa solids before drying to improve flavor development during the drying process. The solids may also be optionally dried on a vacuum belt dryer substantially immediately (or some other desirably short time) after separation in the decanter. Also optionally, the heavy phase may be treated by a two phase separator and a vacuum rotation filter to remove fine particles.

EXAMPLE 1

Referring now to FIG. 1, a detailed exemplar embodiment of a technique for processing cocoa beans is illustrated therein (i.e., as a flow chart illustrating the various steps in one example inventive method of processing cocoa beans). As illustrated in FIG. 1, the subject cocoa processing technique generally begins with fermented cocoa beans which are subsequently subjected to a "breaking" step during which the beans are broken into smaller, non-whole bean particles (e.g., cocoa nibs), and, after which, water is added to form a coffee bean particle mixture or suspension. Following these steps, the bean particles are subjected to further particle size reduction steps which preferably, but not necessarily, result in bean particle sizes of approximately 10 μm or smaller (this is in contrast to certain prior art processing techniques where much larger particle sizes are often employed). Reducing the bean particles to such a size range substantially increases the exposed surface area of the bean particle material therefore allowing it to be more efficiently wet (e.g., with water rather than a chemical solvent) for improved extraction results. Bean particle size reduction, in this regard, is accomplished (in this example embodiment) using, first, a colloid mill, and then, afterwards, a corundum stone mill. In particular, neither of these particle size reduction steps result in significant frictional heat production or too high of mechanical forces being employed such that undesirable emulsification occurs. Of course, other particle size reduction steps can be employed.

Following these particle size reduction steps, and as illustrated in FIG. 1, the cocoa materials are subjected to a heating step (in a heat exchanger at approximately 60 degrees Celsius) during which a cocoa butter liquefaction is obtained and/or improved mechanical phase separation is achieved. Afterwards, a decanting step is employed during which centrifugal forces are utilized to achieve particle separations. In particular, larger particles in this step are generally separated from liquid (in approximate percentages shown in the subject figure). Moreover, solids separated in this step may be dried. Following the decanting step, in a second two-phase separator step and a third three-phase separator step, removal of smaller or fine particles from liquid is achieved (in approximate percentages shown in the subject figure). In such steps, oil based products such as cocoa butter and/or hydrophobic aromatic components can be or are separated from liquid phase components such as cocoa extract and/or hydrophilic aromatic products and/or polyphenol components. In the embodiment illustrated, for example, approximately 6% mass liquid cocoa butter is achieved with approximately 43% mass being associated with aromatics, concentrated polyphenols, and water.

If there is microorganism spoilage of cocoa extracted materials (e.g., cocoa butter), such material can be deodorized employing a vacuum de-aerator. Moreover, if microorganism contamination occurs, a high pressure treatment such as pascalisation is possible (e.g., which is desirable because it can preserve aromatic compounds). However, if both microorganism spoilage and contamination occurs, heat treatment and deodorization may be employed (and are possibly recommended).

If desired, a separated liquid phase (e.g., degreased cocoa extract) can be further treated to remove undesired water. This may be achieved using evaporation techniques which, when employed, can desirably result in water suspended or containing flavor compounds (e.g., to be marked as flavored water). Moreover, concentrated polyphenol products may be obtained. Still furthermore, although such step is not illustrated in FIG. 1, recovered cocoa flavors may be enhanced by reverse flow distillation (e.g., to separate flavor components from water) therefore making them more desirable and/or valuable.

EXAMPLE 2

Turning now to FIGS. 2 through 6, another example embodiment of a method for processing cocoa beans is illustrated therein. Certain example steps in such a process are set forth as follows:
Grinding and suspending: In a grinding and/or suspending step, cocoa beans (e.g., unfermented, fermented, pre-dried, and/or roasted beans) or nibs are combined or suspended with water. Thereafter, optionally using a pump, the mixture or suspension is ground in at least a first grinding step using a perforated disc mill and/or a toothed colloid mill.
Fine grinding: In at least one fine grinding step, cocoa bean cells are macerated. This enables the solvent (water) to wet the cocoa bean material better due to increased available surface area of the macerated cocoa beans.
Heating: In a heating step, optionally using a tube heat exchanger, liquefaction of cocoa butter is achieved by heating (e.g., between 45-70 degrees Celsius). Moreover, improvement of mechanical phase separation is achieved.
Decanter: In at least one decanting step, solids are separated from the liquid phase by centrifugal forces. In this step, primarily coarse or large or high mass solids will be removed. Additionally, the liquid phase may be separated from the light phase (oil phase) and the heavy phase (water phase).
Vibrating screen: In a filtering phase, a vibrating screen is used to remove further coarse solids from the separated light phase and heavy phase.
Two phase separator: Employing a two phase separator, fine particles may be removed from the heavy phase.
Concentrator: In a concentration phase, pre-concentration of the heavy phase and aroma recovery is performed. Further, water and certain flavor compounds are evaporated. Additionally, enhancement of cocoa flavors may be achieved using reverse flow distillation (i.e., to separate flavor compounds and water).
Concentrator: In an optional second concentration phase, evaporation of excessive water is performed. In this step, concentration of water soluble polyphenols and other ingredients (e.g., vitamins) occurs.
Three phase separator: In a three phase separator, fine particles are removed from the light phase and excessive water is separated from the oil phase.
Plate Filter: In an optional plate filter phase, additional fine particles are removed from the light phase and additional water is separated from the oil phase. In some embodiments, cocoa butter results in this phase.
Drum dryer: In a drying step, excess or unwanted water can be removed and aroma recovery performed or a roasting effect achieved. In certain embodiments, this step may produce an aroma phase and/or dry cocoa matter.

EXAMPLE 3

Figure 7:
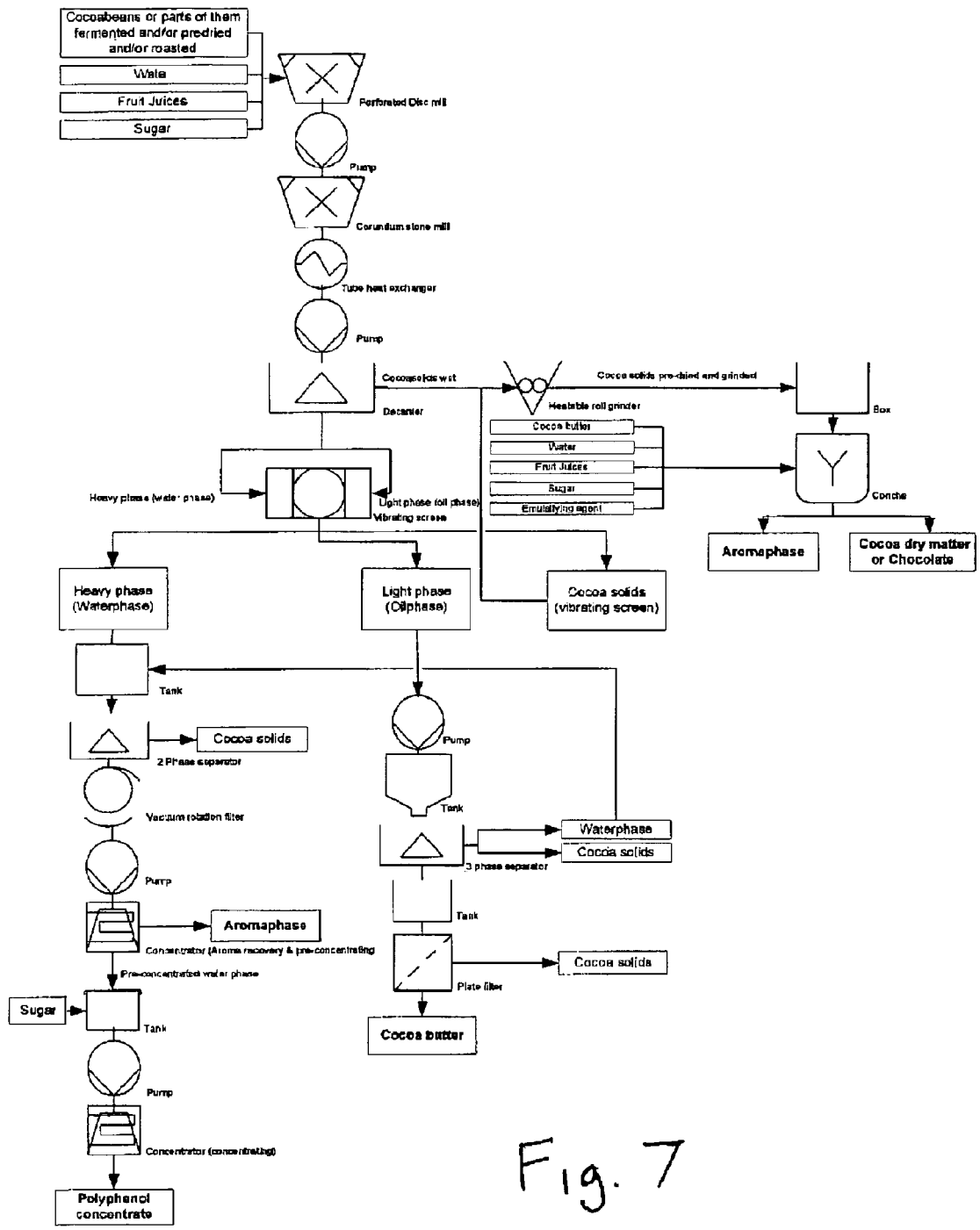
FIG. 7 schematically illustrates an embodiment of an alternative cocoa processing technique according to the subject invention.
Figure 8:
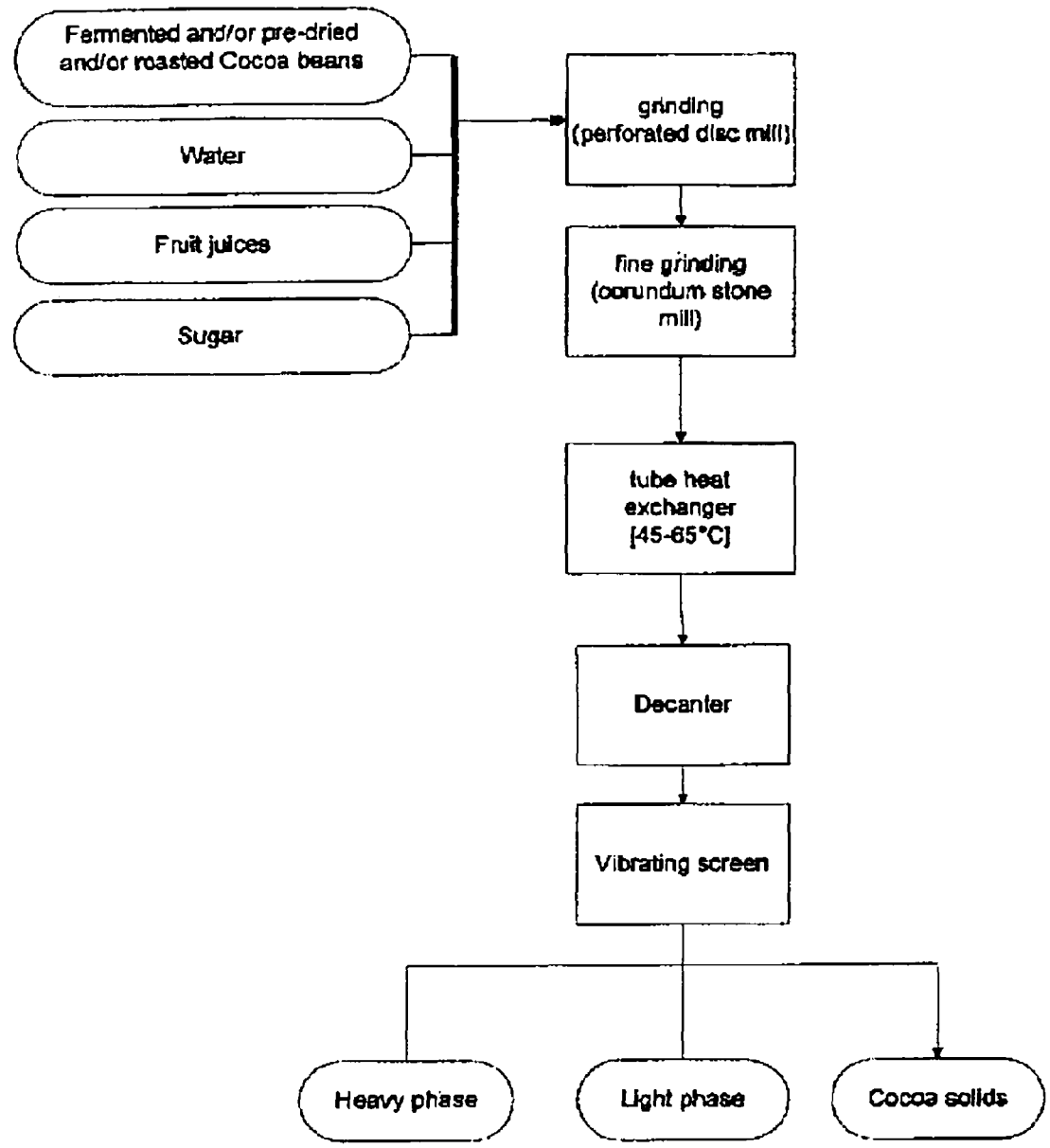
FIG. 8 schematically illustrates certain steps in the embodiment of the cocoa processing technique illustrated in FIG. 7.
Figure 12:
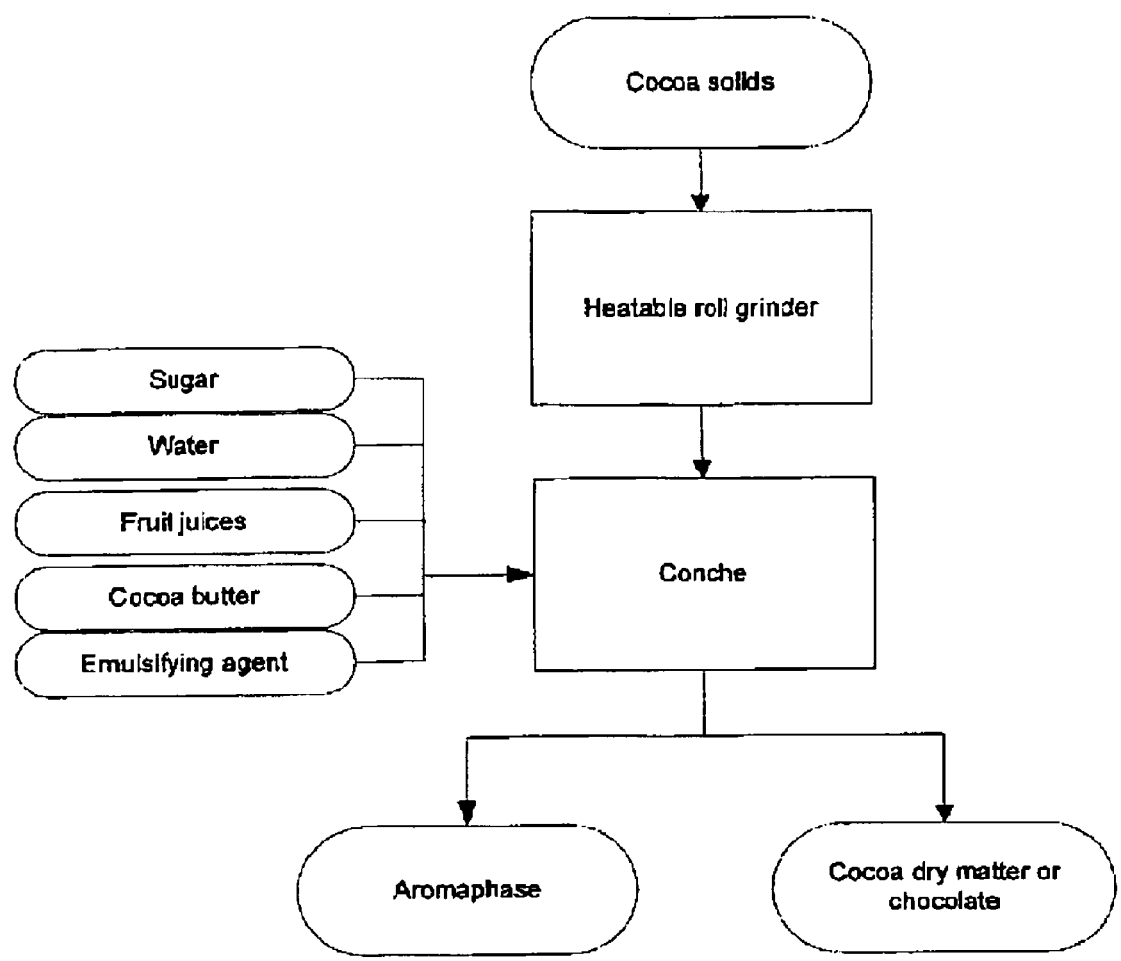
FIG. 12 schematically illustrates certain steps in the embodiment of the cocoa processing technique illustrated in FIG. 9.

Referring now to FIGS. 7, 8, and 12, an alternative process to the one described above is disclosed. Exemplifying the primary (or all) differences between the above-described embodiment and that shown in the subject figures, certain additional and/or modified steps in the process are set forth as follows:
Supplemental to the "Grinding and suspending" step or phase described above, fruit juices and/or sugar is added to the cocoa bean/water mixture or suspension. Such mixture or suspension is then ground or macerated as otherwise described above. Grinding may be performed using a corundum stone mill (e.g., rather than using a toothed colloid mill).
Vacuum Rotation Filter: Subsequent to the "Two phase separator" step or phase described above, a filtration step is performed in which fine particles are removed from the heavy phase to reduce the cloudiness of the liquid.
Heatable roll grinder: In a combined heating and grinding step, a heatable roll grinder is used to remove excess or undesired water and to reduce particle size.
Conche: In a conching step, excess or undesired water is removed, aroma recovery takes place, and a roasting effect is achieved. Optionally, additional tailoring of flavor or development of flavor is performed by adding one or more of sugar and/or fruit juices. Moreover, an emulsifying agent may be added.

EXAMPLE 4

Figure 9:
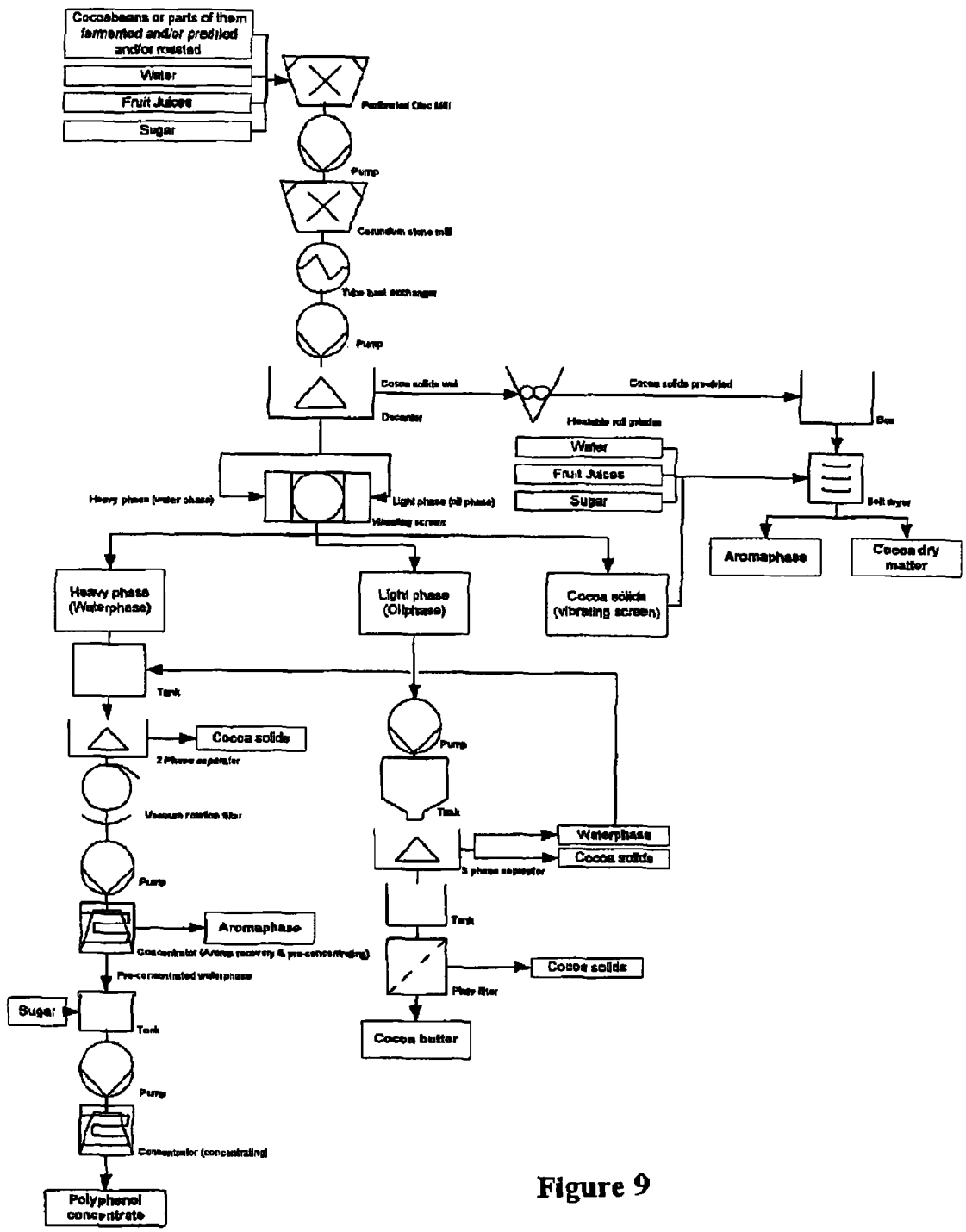
FIG. 9 schematically illustrates an embodiment of an alternative cocoa processing technique according to the subject invention.
Figure 10:
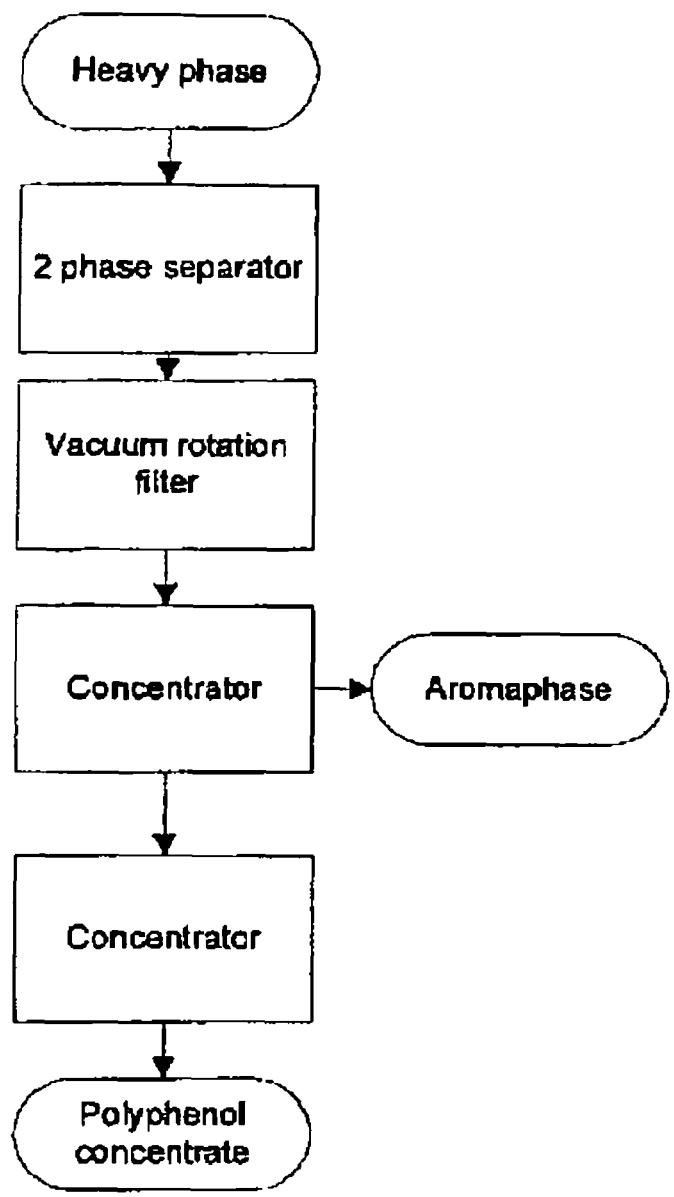
FIG. 10 schematically illustrates certain steps in the embodiment of the cocoa processing technique illustrated in FIG. 9.
Figure 11:
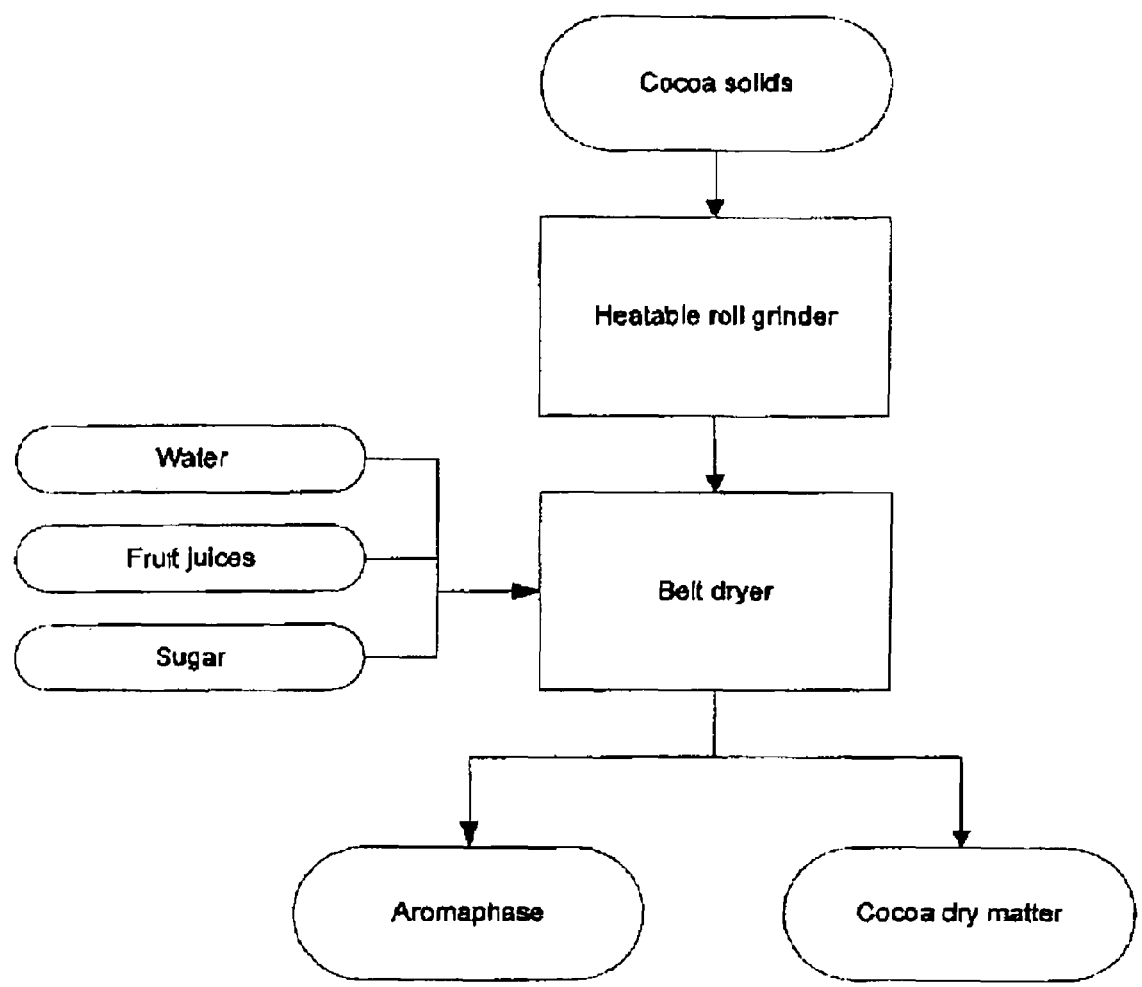
FIG. 11 schematically illustrates certain steps in the embodiment of the cocoa processing technique illustrated in FIG. 9.

Turning now to FIGS. 9 and 11, a still further alternative process for processing cocoa beans is illustrated. As contrasted to the above-described example embodiments, subsequent to a "Heatable Roll Grinder" step or phase similar to the step described with respect to Example 3, a belt dryer is used in this illustrated process. Using such a belt dryer, excess or undesired water is removed and aroma recovery and roasting effects are obtained. In this step, vacuum and condensation may be utilized. Furthermore, flavor may be tailored in this step (alone or in addition to in other steps) by addition of sugar or fruit juices, for example (other flavor changing materials or substances may, of course, be added). In this stage, both aromatics and dry cocoa matter may be obtained.

EXAMPLE 5

Figure 13:
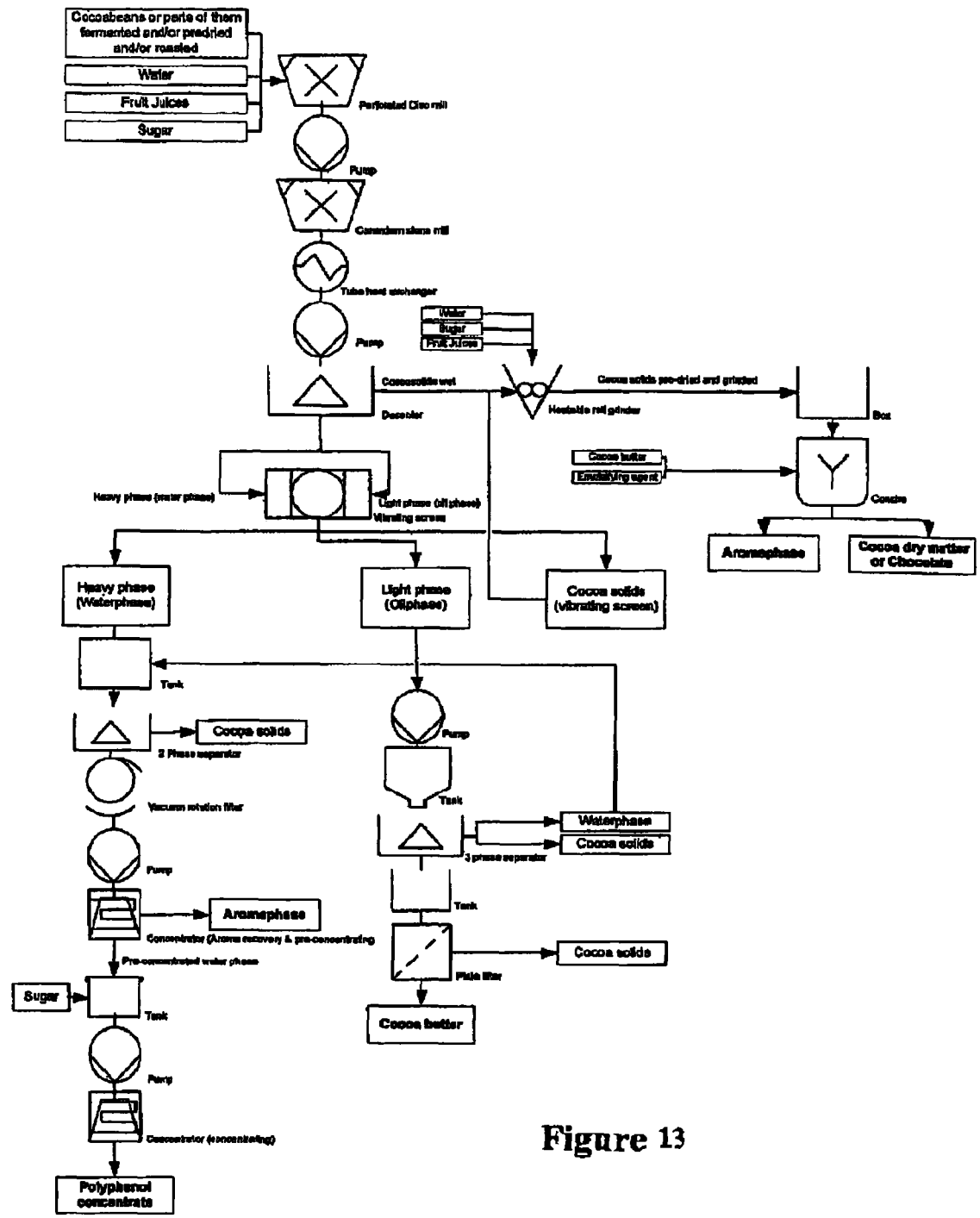
FIG. 13 schematically illustrates an embodiment of an alternative cocoa processing technique according to the subject invention.
Figure 14:
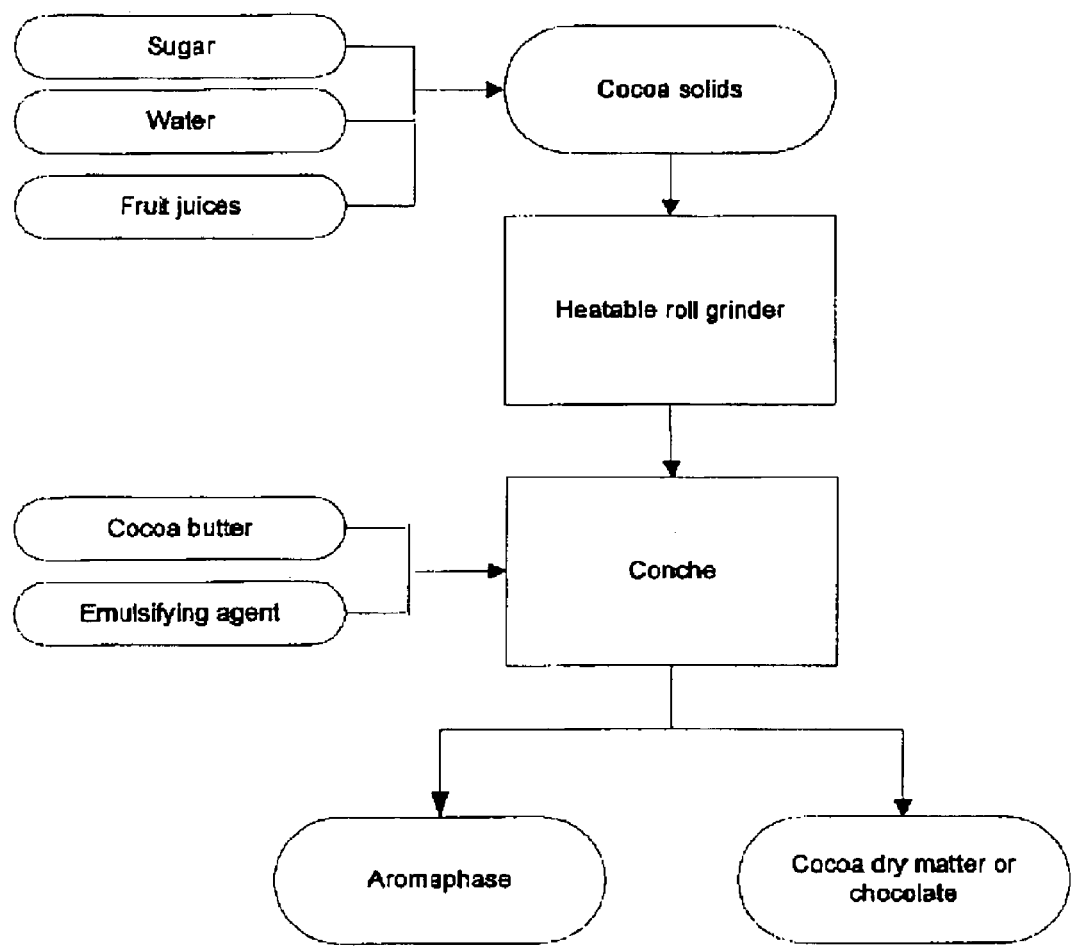
FIG. 14 schematically illustrates certain steps in the embodiment of the cocoa processing technique illustrated in FIG. 13.

Referencing now FIGS. 13 and 14, an additional alternative embodiment of a cocoa processing method is disclosed. Although the process in these figures resembles that process disclosed in FIG. 7, certain significant differences between the processes are apparent. In particular, as seen best in FIG. 14, sugar, water, and fruit juices are added to cocoa solids prior to the solids being processed or treated in a heatable roll grinder. Furthermore, cocoa butter and an emulsifying agent are added in the conching phase. Similar to the process disclosed in FIG. 12, however, employing these steps, aromatics and/or dry cocoa matter and/or chocolate may be obtained.

Using the herein described technique(s), cocoa beans may be efficiently processed to produce desirable, commercially valuable yields of dried and extracted cocoa powder, cocoa butter with hydrophobic cocoa flavor, hydrophilic cocoa flavor, and polyphenol concentrates. Moreover, certain resultant cocoa products retain or contain desirable levels of anti-oxidants and/or vitamins and/or possess more desirable (e.g., less bitter) flavors which, in turn, do not require sugar additions (or, at least, high levels or sugar additions) when used in food stuffs.

Although not intended to be limiting in any respect, FIG. 15 is provided in this application to illustrate example mass percentages of cocoa products which may be obtained when performing one or more of the herein described cocoa bean processing techniques.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

We claim:

1. A method for processing cocoa beans comprising:
   adding water to a plurality of cocoa beans to form a cocoa bean water suspension;
   wet grinding said cocoa bean water suspension in a first grinding step in a first mill;
   subsequently, wet grinding said cocoa bean water suspension in a second grinding step in a second mill;
   heating said cocoa bean water suspension, which was wet grinded in a first and second grinding step, to a temperature of approximately 70 degrees Celsius or less;
   subsequently, decanting said cocoa bean water suspension such that said suspension is separated into three phases, a water phase, a fat phase, and solids.

2. A method for processing cocoa beans comprising:
   adding water to a plurality of cocoa beans to form a mixture;
   fine grinding the cocoa bean/water mixture;
   heating the finely ground cocoa bean/water mixture to a temperature of approximately 70 degrees Celsius or less to obtain a cocoa bean mixture/suspension;
   decanting the cocoa bean mixture/suspension to separate larger solids from liquid;
   separating smaller and/or fine solid particles from liquids and/or separating oil products from non-oil products.

3. The method according to claim 1 further including a step wherein said solids are dried in a dryer after separation in said decanting step to obtain aromatics and cocoa solids.

4. The method according to claim 1 further including a step wherein material obtained as said water phase is processed in a two phase separator to remove fine particles from said water phase.

5. The method according to claim 1 further including a step wherein said water phase is subjected to a first concentration step to obtain aromatics.

6. The method according to claim 5 further including a step wherein said water phase is subjected to a second concentration step to obtain polyphenols.

7. The method according to claim 1 further including a step wherein said fat phase is filtered on a vibrating screen to remove substantial solids.

8. The method according to claim 1 further including a step wherein said fat phase is further processed in a three phase separator to remove excess water and remaining solids.

9. The method according to claim 1 further including a step wherein said fat phase is filtrated and cocoa butter is obtained.

10. The method according to claim 1 or 2 wherein cocoa butter is produced and when said cocoa butter exits said decanting step, said cocoa butter is caused to exit at a temperature selected from between approximately 45 and 50 degrees Celsius.

11. The method according to claim 1 or 2 wherein cocoa powder is produced from said solids and said larger solids, respectively which said cocoa powder is dried at a temperature selected from between approximately 55 and 70 degrees Celsius.

12. The method according to claim 1 wherein said first grinding step is performed with a perforated disc mill.

13. The method according to claim 1 wherein said second grinding step is performed with a toothed colloid mill.

14. The method according to claim 1 wherein said second grinding step is performed with a corundum stone mill.

15. The method according to claim 1 wherein after said first grinding step, a pump pumps said cocoa bean water suspension to a location wherein said second grinding step is performed.

16. The method according to claim 1 wherein during said heating step, said cocoa bean water suspension is heated utilizing a tube heat exchanger.

17. The method according to claim 1 wherein prior to one or more wet grinding steps, sugar and/or fruit juices are added to the cocoa bean water suspension or mixture.

18. The method according to claim 1 wherein said solids comprise wet solids and the method further includes an additional step where said wet solids are treated with a heatable roll grinder to reduce particle size and begin pre-drying.

19. The method according to claim 1 further including a step in which sugar, sugar solution, and/or fruit juices are added to extracted cocoa solids before drying of the solids.

20. The method according to claim 1 wherein extracted cocoa solids are dried on a vacuum belt dryer following separation in said decanting step.

21. The method according to claim 1 wherein a drying step produces aromatics and/or cocoa solids.

22. The method according to claim 1 wherein the water phase is treated by a two phase separator and a vacuum rotation filter to remove fine particles.

23. The method according to claim 1 wherein prior to one or more grinding steps, said cocoa beans are broken to form cocoa nibs.

24. The method according to claim 1 or 2 wherein in one or more grinding steps, said cocoa bean water suspension or mixture is ground to include cocoa bean particle sizes of substantially no more than approximately 10 micrometers or less.

25. The method according to claim 2 wherein a coarse grinding of said cocoa bean water mixture is performed prior to said fine grinding step.

26. The method according to claim 1 or 2 wherein said cocoa processing steps are performed without use of non-water solvents.

27. The method according to claim 1 or 2 wherein each of said cocoa processing steps are performed at temperatures of no more than approximately 70 degrees Celsius.

* * * * *